Jan. 28, 1964 L. FUCHS 3,119,480
BI-DIRECTIONAL, NO-BACK TRANSMISSIONS
Filed April 13, 1961 3 Sheets-Sheet 1

INVENTOR
LOUIS FUCHS

BY *Harry G. Shapiro*

ATTORNEY

Jan. 28, 1964  L. FUCHS  3,119,480
BI-DIRECTIONAL, NO-BACK TRANSMISSIONS
Filed April 13, 1961  3 Sheets-Sheet 2

INVENTOR
LOUIS FUCHS
BY *Harry G. Shapiro*
ATTORNEY

Jan. 28, 1964  L. FUCHS  3,119,480
BI-DIRECTIONAL, NO-BACK TRANSMISSIONS
Filed April 13, 1961  3 Sheets-Sheet 3
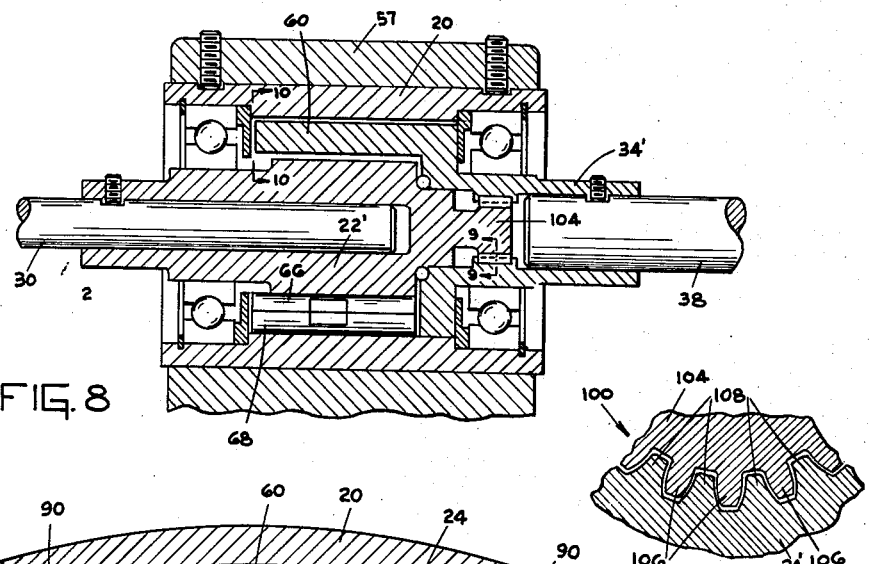
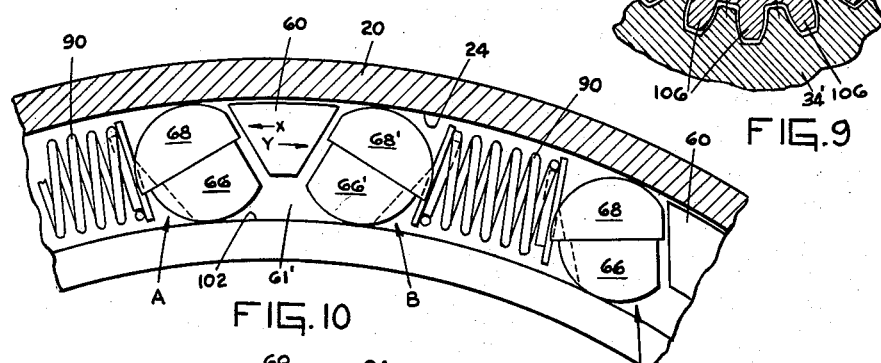
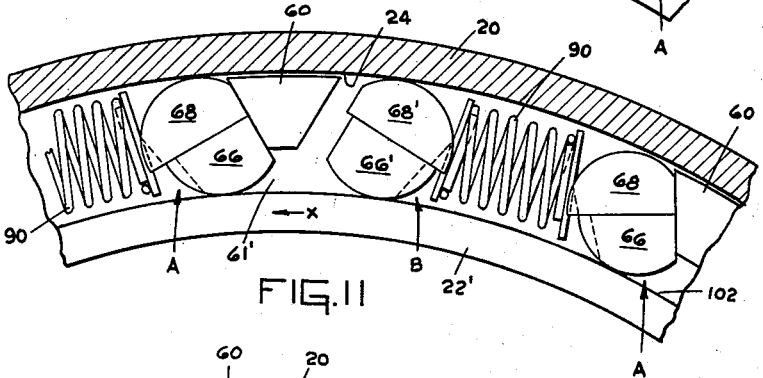
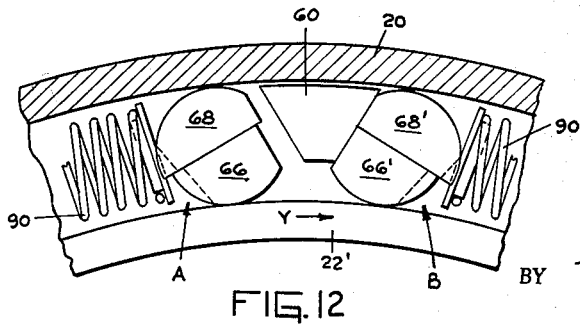
INVENTOR
LOUIS FUCHS
BY Harry G. Shapiro
ATTORNEY United States Patent Office 3,119,480
Patented Jan. 28, 1964

3,119,480
BI-DIRECTIONAL, NO-BACK TRANSMISSIONS
Louis Fuchs, East Orange, N.J., assignor to Airborne Accessories Corporation, Hillside, N.J., a corporation of New Jersey
Filed Apr. 13, 1961, Ser. No. 102,694
12 Claims. (Cl. 192—44)

The invention relates to improvements in transmissions of the type in which an input or driving member may be rotated in either direction to drive an output or driven member combined with self-acting or automatic means to prevent the application of reverse or feed-back torque from either direction to the driving equipment. Transmissions of this type are generally referred to as bi-directional, no-back transmissions. More particularly, the invention is directed to improvements in bi-directional, no-back clutches.

In bi-directional, no-back clutches of known construction utilizing wedging means in the form of a cam and ball or roller, or sprag assemblies, the character and magnitude of the unwedging forces are such that smooth, efficient operation has been extremely difficult to obtain; there is jolting or chatter. Various proposals have been suggested to eliminate chatter. Such proposals, however, have resulted in devices which are quite complicated and expensive.

In accordance with the invention, a bi-directional, no-back wedging type of clutch is provided wherein chatter is virtually eliminated; the structure and mode of operation of the wedging means of the invention obviates the necessity for extraneous, complicating and expense-adding components. While this significant purpose of the invention is particularly relevant to clutches, such purpose also is applicable to transmissions of the bi-directional, no-back type in general.

Another object of the invention is to provide a bi-directional, no-back wedging type of transmission which, together with the ability to provide substantially instantaneous transmission of torque or braking at maximum value, affords substantially zero break-away; that is, the force required for the wedging means to release from its torque-transmitting function or braking action is practically zero.

A further object of the invention is to provide a bi-directional, no-back wedging type of transmission which, due to its structure and mode of action, furnishes substantial torque capacity, and braking action, for any given size of unit, possesses unusually long operating life, and retains the ability to provide substantially initial rated torque capacity despite prolonged use under heavy loads. A transmission provided with the wedging means of the invention is self-compensating to adjust for wear.

Still a further object of the invention is to provide a bi-directional, no-back wedging type of transmission wherein the elements of the wedging means have a configuration permitting them to be sized for an unusually wide range of units, including transmissions of extremely small sizes, without incurring the operational limitations imposed by transmissions of this type which use known sprag configurations.

Another object of the invention is to provide a bi-directional, no-back transmission of the wedging type wherein the parts of the wedging assemblies possess a configuration of such geometrical simplicity that their fabrication is accomplished easily and inexpensively.

Still another object of the invention is to provide a bi-directional, no-back clutch of the wedging type wherein the torque required to drive an opposing load is essentially the same as the torque required to drive an aiding load.

These, and other objects and advantages will be apparent from the following description of several preferred embodiments of the invention, taken in conjunction with the drawings, in which:

FIG. 8 is a vertical, cross-sectional view, partly in elevation, illustrating the wedging means of the invention serving to prevent feed-back torque in a bi-directional transmission in which the driving member is splined or keyed to the driven member;

FIG. 9 is a partial view taken approximately in the plane of line 9—9 of FIG. 8;

FIG. 10 is a view taken approximately in the plane of line 10—10 of FIG. 8, this view showing the parts when the transmission is in the neutral position;

FIG. 11 is a view similar to FIG. 10, showing the relationship of the parts when torque is transmitted in one direction; and FIG. 12 is a view similar to FIG. 11, but showing the parts when torque is transmitted in the opposite direction.

Figure 1:
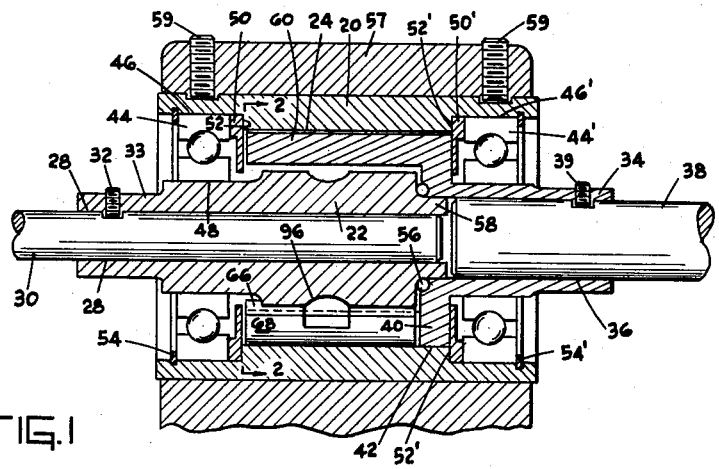
FIG. 1 is a vertical, cross-sectional view, partly in elevation, illustrating the invention as applied to a clutch.

The wedging means of the invention, which permits the transmission of torque in either direction from the input to the output, but which will not permit reverse or feed-back torque in either direction to be imposed upon the input member, comprises a pair of opposed wedging assemblies positioned between a pair of coaxially arranged, radially spaced, relatively rotatable members. Control means, for selective coaction with one wedging assembly or the other, is positioned between the radially spaced, relatively rotatable members and intermediate the opposed pair of wedging assemblies.

Each assembly of the opposed pair of wedging assemblies comprises two elements, each element having a cross-section which provides a flat face and an opposite convex face. Preferably, the elements are in the form of pins which extend axially between the coaxially arranged, radially spaced, relatively rotatable members. The convex face of each element possesses a substantial or comparatively large radius of curvature. The two elements of each wedging assembly are assembled with their flat faces in engagement with each other and with their convex faces in respective engagement with the coaxially arranged, radially spaced members.

The elements of each wedging assembly are dimensioned so that their assembled height would be greater than the spacing between the radially spaced surfaces provided by the relatively rotatable members if the elements were related so that their areas of maximum height were in alignment with one another and, of course, if the wedging assembly were not confined by the fixed radial spacing between the relatively rotatable members. The elements, however, are assembled with their areas of maximum height laterally offset from one another. The plane of engagement of the flat faces of the elements of each wedging assembly is angularly disposed to provide a release angle greater than the friction angle of a convex face with an adjoining member. The angle of the plane of engagement of the flat faces of one wedging assembly is substantially the same as but at an angle opposite to the angle of the plane of engagement of the flat faces of the other or opposing wedging assembly. Resilient means is provided to urge the elements of each wedging assembly together and against the relatively rotatable members.

With the elements of each of the opposed wedging assemblies related to one another in the manner described, the elements of the respective assemblies are capable of relative linear movement to a limited extent, such type of movement being permitted by the ability of the elements to slide where their flat faces engage one another, the convex faces being in resilient, frictional engagement with the respective, relatively rotatable members. As a result, the effective height of each assembly may be changed to the extent that the elements' areas of maximum height are moved toward or away from one another. Thus, as soon as one of the relatively rotatable members is rotated in a direction which causes the adjoining wedging element with which it is frictionally and resiliently engaged to be displaced in a direction which moves the elements' areas of maximum height toward one another, the effective height of such assembly is increased, thereby firmly connecting the coaxially arranged radially spaced members. In such direction of rotation which causes the effective height of one assembly to be increased, the opposing assembly is idle in the sense that its effective height is not increased in such direction of rotation, though in readiness for coupling or braking should the direction be reversed. When the direction of rotation is reversed, the elements of the second or opposing assembly have their areas of maximum height moved toward one another, increasing the effective height of such assembly and firmly coupling the radially spaced members. The first wedging assembly is then idle. Release is virtually instantaneously accomplished when the direction of rotation of a member is such as to cause the wedging elements' areas of maximum height to move apart. Due to the geometry of the parts, the extent of movement of the wedging elements to connect and to release is very small; the tolerances for effective operation, however, are large.

By providing the aforementioned control means intermediate a pair of the opposed wedging assemblies, and when such control means is actuted by the rotation of the input or driving member for cooperation with one wedging assembly or the other of the pair, depending upon the direction of rotation of the driving member, such control means, in the case of a clutch arrangement, acts to drive an output shaft in one direction, or the other, through one or the other element of a wedging assembly. When feed-back or reverse torque would be imposed upon the driving member, the second wedging assembly, which is idle in driving, serves as an automatic brake to prevent feedback torque. Similarly, the action is reversed in the opposite direction of rotation.

When the driving member is splined or keyed to the output member, the control means connected to the driving member acts upon one wedging assembly, or the other, depending upon the direction of rotation, to reduce the effective height of one wedging assembly and permit the transmission of power to the output shaft; the second wedging assembly of the pair has an effective height which does not limit or impose any braking action in the driving of the output member. Should feedback torque tend to be imposed upon the driving member, one of the wedging assemblies, or the other, depending upon the direction of application of the feed-back torque, has its effective height increased to prevent the imposition of feed-back torque upon the driving member.

In greater detail, reference is made to FIGS. 1 to 7 which illustrate the invention as applied to a bi-directional clutch. A pair of coaxially arranged, radially spaced, relatively rotatable members 20 and 22 are provided. The member 20 is hollow and has a smooth, annular, internal bore or race 24. The member 22 has an outer surface 25 which is concentric with the surface 24. The periphery 25 has formed therein a pair of longitudinally or axially extending recesses or grooves 26 and 26'. Preferably, two or more pairs or sets of grooves 26, 26' are formed in the external face of the member 22. The grooves are arcuately shaped, being substantially semi-circular in form, or they may each present a concave surface which proscribes an arc somewhat less than a semi-circle. As shown, the member 22 is provided with a central, longitudinally extending bore 28 within which a shaft 30 may be positioned. Securing means 32, such as a set-screw, is provided to releasably secure the shaft 30 to the member 22, the member being formed with a hub portion 33.

A third member 34 is assembled with the relatively rotatable members 20 and 22. The member 34 preferably is in the form of a hollow sleeve having a central bore 36 which is adapted to receive a shaft 38. The shaft 38 is secured for rotation with the member 34, as by a set-screw 39. The member 34 is provided with a radially extending flange 40 at the inner end thereof, such flange having a height which positions its circumferential edge 42, with a slight amount of clearance, immediately adjacent the race 24.

The members 20, 22 and 34 are assembled for relative rotation and maintained in concentricity with respect to one another by suitable bearing means. As shown in FIG. 1, a ball-bearing 44 is positioned between the member 20 and the member 22. The member 20 is counter-bored at each end thereof at 46 and 46', and the outer periphery of the member 22 is reduced for a portion thereof at 48 to allow positioning of the bearing 44 between the radially spaced surfaces 46 and 48. The bearing 44 is secured in position against axial movement by an annular spacer 50 on one side thereof, the spacer abutting a radially extending shoulder 52 provided by the counter-bored portion of the member 20. The other side of the bearing is confined by a snap ring 54 positioned in an annular groove formed in the internal periphery of the member 22 in the counter-bored area 46. On the opposite side of the assembly, a ball-bearing 44' is positioned between the counter-bored surface 46' of the member 20 and the outer periphery of the member 34, which has its flanged portion 40 located inside of the bearing. Similarly the bearing is maintained in position by a spacer 50' on one side thereof seated against a shoulder 52', with the opposite side of the bearing secured against longitudinal displacement by a snap ring 54'. The member 34 is rotatably mounted with respect to the member 22, and the member 20, by a full complement of ball-bearings 56 circumferentially arranged between the inner end of the member 34 and a portion 58 of reduced diameter on the member 22. The adjoining areas of the members 22 and 34 are provided with complementary grooves, and the ball-bearings are maintained in circumferentially spaced relationship by the usual cage element (not shown).

If desired, the described assembly of relatively rotatable members may be situated within an annular housing 57 which closely surrounds the external surface of the member 20 with a slight amount of clearance. With the housing fixed to a base, the member 20 may be made stationary by fastening means or screws 59 which secure the member to the fixed housing.

Figures 2, 3:
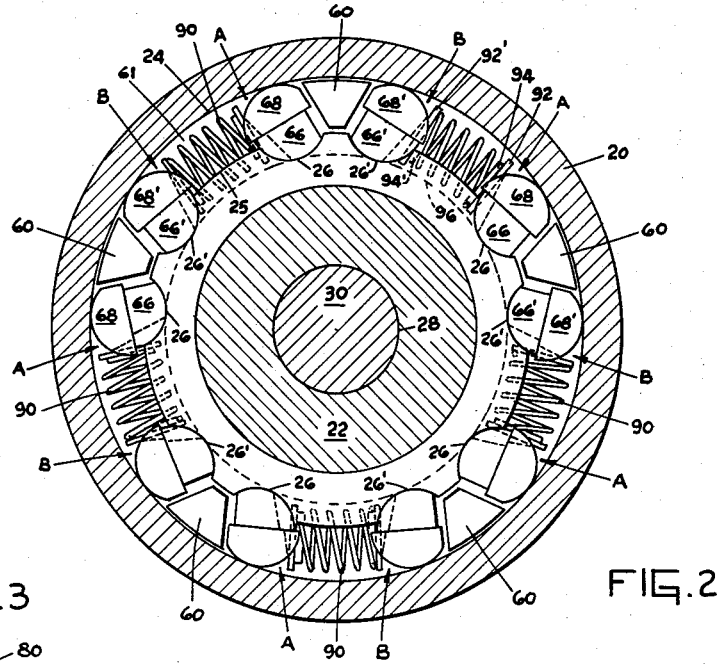
FIG. 2 is a view, on an enlarged scale, taken substantially in the plane of line 2—2 of FIG. 1.
FIGS. 3 and 4 are perspective views showing the elements of a wedging assembly.
Figure 4:
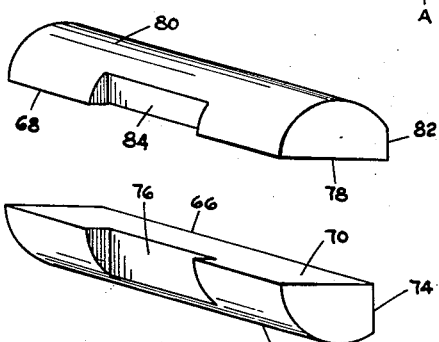
Figure 5:
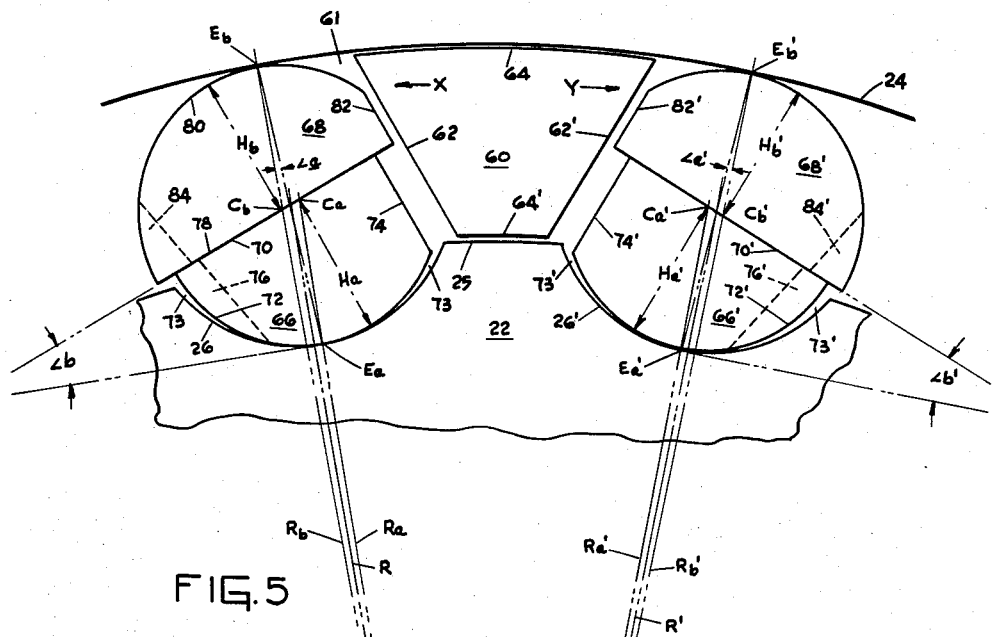
FIG. 5 is an enlarged view showing a pair of opposed wedging assemblies and their related parts when the clutch is in the neutral position.

The member 34 is provided with control means, preferably in the form of one or more axially extending fingers 60. The fingers extend into the area or space 61 between the radially spaced surfaces 24 and 25 of the members 20 and 22. As shown in FIGS. 2 and 5, the control fingers 60 each have a height slightly less than the radial spacing between the surfaces 24 and 25. Preferably, the fingers are each substantially trapezoidal in cross-section with their opposite side faces 62 and 62' arranged to converge toward the surface 25. The opposite sides 64 and 64' of each finger may be slightly curved so that movement of the finger or fingers in a circumferential direction will closely clear, without interference, the adjacent surfaces 24 and 25. The control fingers may be made integral with the flanged portion 40 of the member 34, or such fingers may be separately made and securely fastened to the member 34 by any suitable means for rotation therewith.

A pair or set of opposing wedging assemblies A and B are positioned between the members 20 and 22, one assembly on each side of a control finger 60. While it is contemplated that a single pair of wedging assemblies may be used, it is preferred to provide a plurality of sets of opposing wedging assemblies, with a coacting control finger for each set of wedging assemblies. Two sets of wedging assemblies positioned at diametrically opposite sides will furnish a balanced arrangement. With an increased number of sets of wedging assemblies, the torque capacity, and the capacity to resist feed-back torque, are increased. Hence, it is preferred to use as many sets of wedging assemblies, and coacting control fingers, permitted by the dimensions of the members 20 and 22. In the embodiment shown in FIGS. 1 and 2, five circumferentially and equidistantly spaced sets of wedging assemblies are used.

As shown in FIGS. 2, 3, 4 and 5, the wedging assembly A comprises a pair of elements 66 and 68, preferably in the form of machined steel pins. The pins, which are substantially equal in length, have a length slightly less than the distance between the flange 40 of the member 34 and the annular spacer 50 (FIG. 1). In cross-section, the pin 66 has a flat face 70 and an opposite convex face 72. The convex face, which has a substantial radius of curvature, is located in the concavely-shaped groove 26. The conformity of the concave surface of the groove 26 with respect to the convex face 72, as in ball-bearing practice, is greater than 50%; that is to say, the radius of curvature of the concave surface is greater, slightly greater, than the radius of curvature of the convex face of the pin 66. Hence, the slight amount of clearance at the areas designated 73.

The pin 66 is provided with a smooth, unbroken, longitudinally extending flat side 74 representing a chord between the flat face 70 and the convex face 72. If the surface generated by the convex face 72 were to be extended beyond the flat side face 74, the pin 66 would be substantially semi-circular in cross-section. The side of the pin opposite to the side 74 is provided with a recess 76 substantially centrally of the length of the pin. The purpose of this recess will be subsequently described. Like the pin 66, the pin 68 is formed to provide, in cross-section, a flat face 78 and an opposite convex face 80. Along one side of the pin 68 a flat face 82 is provided, and on the opposite side a recess 84 is milled in or otherwise formed midway of the length of the pin. The pin 68 is wider than the lower pin 66.

Referring to FIG. 5, the pins 66 and 68 are assembled so that their flat faces 70 and 78 are in engagement for relative sliding or linear movement. The pins' convex faces 72 and 80 are in respective engagement with the concave surface provided within the groove 26 and the race 24, respectively. The areas of maximum height $H_a$ and $H_b$ of each of the pins are of such magnitude that if the pins were positionally related to place their areas of maximum height in linear alignment with one another, their assembled height or diameter would be greater than the radial spacing between the race 24 and the surface provided by the groove 26. The pins, however, are laterally offset from one another, and are held in such offset relationship by resilient means, to be subsequently described. Both sides of the wider top pin 68 overhang the sides of the lower pin, the extent of overhang however, permitting uninterrupted linear displacement of the top pin to the point where the side 82 is in linear alignment with the side 74.

The centers of curvatures of the pins, or the points of maximum height $C_a$ and $C_b$ on the pins' flat faces 70 and 78, respectively, are laterally offset from one another. The points $E_a$ and $E_b$, where the convex faces 72 and 80 respectively engage the surface 26 and the race 24 are laterally offset from one another, being located on opposite sides of a radial line R extended midway between the centers $C_a$ and $C_b$ from the common center $o$ for the concentric surfaces 24 and 25.

The angle $a$, defined by a line extended between the points of engagement $E_a$ and $E_b$ and a radial line $R_a$, and $R_b$, extended from the common center $o$ intersecting a point of engagement, represents the angle of drive or the driving angle. The driving angle is at least 2° and preferably within a range of 2 to 8°.

The pins 66 and 68 are related to one another and the respective adjoining surfaces 26 and 24, so that the wedging assembly A is capable of releasing substantially instantaneously and without drag. The practically zero break-away, and absence of chatter provided by the wedging assembly of the invention is obtained by providing a release angle $b$ which is greater than the friction angle of the material constituting the wedging elements and the adjoining surfaces of the members 20 and 22. Where the parts are of machined steel, the release angle is preferably in the range of 12 to 40°, an angle of 20° being suitable. The friction angle of machined steel is approximately 7°. The release angle is the angle defined by the plane of engagement of the flat faces 70 and 78 and the line of tangency at the point of contact $E_a$ or $E_b$.

The wedging elements of the assembly B are related to one another and to the respective adjoining surfaces provided by the members 20 and 22 in exactly the same way as hereinbefore described in connection with the wedging assembly A, except that the angle of the plane of engagement of the elements' flat faces of this assembly is opposite to the angle of the plane of engagement of the flat faces of the wedging assembly A. Thus, while the driving angle $a'$ and the release angle $b'$ of the assembly B are substantially equal to the angles $a$ and $b$, respectively, such angles are oppositely directed circumferentially. Like parts of the wedging pins of the assembly B are referred to by the same, but primed reference characters.

The elements 66 and 68 of the wedging assembly A, and the elements 66' and 68' of the wedging assembly B, are respectively urged together and against the surfaces 26, 26' and 24 provided by the coaxially arranged, radially spaced, members 22 and 20 by resilient means. As shown, the resilient means preferably comprises coiled compression springs 90 positioned intermediate a wedging assembly A of one set of assemblies and a wedging assembly B of a second adjacent set of assemblies. One end of each coiled spring engages a bearing plate 92 positioned in the recess 84 of the upper pin 68. To properly locate and center the spring, the plate 92 is provided with a central boss 94 which extends within the coiled spring's diameter with a slight amount of clearance. The other end of the spring bears against a plate 92' which is positioned in the recess 84' of the top element 68' of an assembly B, such bearing plate also having a spring-locating boss 94'. Also, as shown in FIGS. 1 and 2, a central annular groove 96 preferably is provided on the outer face of the member 22 to suitably confine the springs 90 for engagement with the plates 92 and 92'. Thus, the springs apply pressure to the top element of each assembly on the sides thereof opposite the sides on which the control fingers are located. The recesses 76 and 76' in the lower pins 66 and 66' serve to provide a safety measure of clearance so that the springs will not apply pressure directly to the lower pins. By balancing the forces applied by the springs to the upper pins of all of the wedging assemblies, the same torque is required to drive an opposing load as an aiding load. FIGS. 2 and 5 show the arrangement of the elements of the respective wedging assemblies and the position of the control fingers with respect to the wedging assemblies of each set of assemblies when the clutch is in neutral position.

Figure 6:
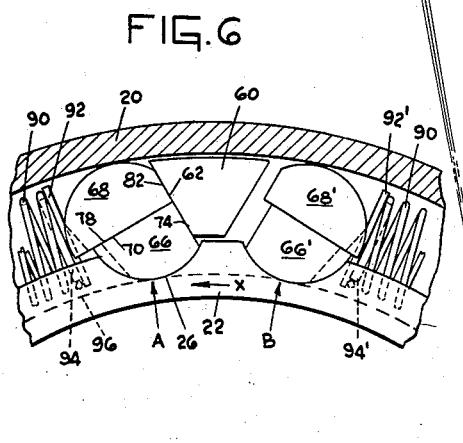
FIG. 6 illustrates the relationship of the parts when torque is transmitted in one direction.

The described structural arrangement affords a bi-directional, no-back clutch suitable for a variety of applications, including driving, indexing, positioning, over-running and back-stopping. For driving, indexing or positioning applications, the member 20 is fixed or made stationary. This may be accomplished in any suitable manner, such as by fixing the member 20 to the fixed housing 57 by the securing means 59. It will be understood, of course, that the member 20 may be directly secured to any suitable base to render it a stationary member. With the shaft 38 constituting the driving shaft, through the rotatably mounted member 34, the member 22 is the output member and the shaft 30 secured thereto is the driven shaft. When the driving shaft 32 is rotated in a direction which causes the driving member 34, and the control fingers 60 secured thereto, to move from the position shown in FIGS. 2 and 5 in the direction of the arrow X (FIG. 5), the side 62 of each finger 60 engages the side 82 of the upper pin 68 causing such pin's flat face 78 to slide along the face 70 of the lower pin 66 until the side 62 of the finger engages the flat side 74 of the lower pin. The pins' centers $C_a$ and $C_b$ have now been moved apart to an extent to allow driving. Actually, the extent of movement of the finger 60, and of the top pin with respect to the bottom pin, is very small. Displacement of the upper pin 68 and, of course, all of the other upper pins of the assemblies A are against the resilient pressure provided by the springs 90. Since the lower pins 66 are positioned or nested in the grooves 26, positive driving of the output member 22, through the pins 66, begins in the direction of the arrow X as shown in FIG. 6. In such direction of rotation, the pins 66' of the assemblies B are carried by the member 22 in a direction which causes the centers $C_a'$ and $C_b'$ to move apart and thereby allow driving without interference from the wedging assemblies B. This drive position is maintained against an opposing load.

When the load is aiding, the output member 22 tries to precede the driving member 34. If the aiding load becomes of a magnitude to impose feed-back torque upon the driving equipment, the control fingers 60 then fall back away from the drive position shown in FIG. 6 to the position where they are disengaged from the top pins 66, as shown in FIGS. 2 and 5. In this latter position, the centers $C_a$ and $C_b$ of the wedging elements of the assemblies A, and the centers $C_a'$ and $C_b'$ of the assemblies B, under the resilient pressure exerted by the springs 90, have respectively moved toward one another to increase the effective height of the wedging assemblies. When the output member 22 would apply reverse torque, or in a direction opposite to the direction of the arrow X (FIG. 6), the assemblies B firmly connect the output member to the stationary member 20 so that feed-back torque cannot be transmitted to the fingers 60, the driving member 34 and the driving shaft 30. The angular disposition of elements of the assemblies A is such that they slip, so to speak, and do not furnish any braking or coupling function in such direction of rotation of the output member 22.

Figure 7:
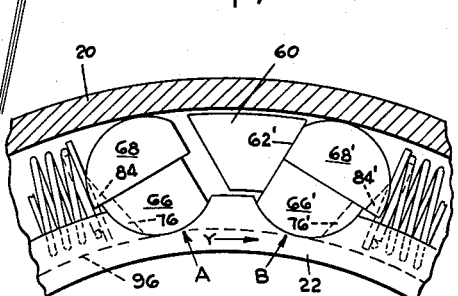
FIG. 7 is a view similar to FIG. 6, but showing the relationship of the parts when torque is transmitted in the opposite direction.

When the driving member 34 is rotated in a direction which causes the fingers 60 to rotate in the direction of arrow Y, as shown in FIG. 5, the pins 68' are linearly displaced and the output member 22 is rotated in the same direction, or the direction of the arrow Y, as shown in FIG. 7. The action of the related parts in driving is the same as previously described, but through the pins 66' of the assemblies B. When the output member 22 would apply reverse torque, or in a direction opposite to the direction of the arrow Y (FIG. 7), the assemblies A firmly connect the output member to the stationary member 20 so that feed-back torque cannot be transmitted to the fingers 60, the driving member 34 and the driving shaft 30. Similarly, the angular disposition of elements of the assemblies B is such that they slip, and do not furnish any braking or coupling function in such direction of rotation of the output member 22.

Upon stopping the rotation of the driving member 34, the pins of the respective wedging assemblies automatically assume a relative position which causes the rotation of the output member to be stopped immediately. When the driving member 34 is stationary and torque is applied to the output member 22 in the direction of the arrow X as shown in FIG. 6, the pins of the wedging assemblies A have their centers $C_a$ and $C_b$ moved toward one another causing the effective height of these assemblies to be increased, thereby preventing feed-back torque from being imposed upon the stationary input member 34. If a reverse torque is imposed upon the output member 22, then the effective height of each of the assemblies B is increased to prevent the application of feed-back torque to the stationary input member.

Due to the sliding arrangement of the top pins with respect to the bottom pins, and the aforementioned release angle, there is no break-away torque, and virtually no chatter, when the effective height of the assemblies are reduced to uncouple or disconnect the adjoining surfaces of the members 20 and 22, and to begin driving.

For a bi-directional, over-running application, the member 22 is fixed or secured to prevent its rotation, and with the member 34 serving as the driving member, the member 20 is mounted to permit its rotation and to serve as the driven member. For this purpose, the member 20 is disconnected from the fixed housing 57. Rotation of the driving member 34 in one direction of rotation or the other, through the control fingers 60, drives the rotatable member 20 through either the pins 66 of the assemblies A or the pins 66' of the assemblies B, and prevents the imposition of feed-back torque upon the driving member 34 while allowing over-running.

The described clutch may also be used for bi-directional drive and reversing applications by suitably connecting a reversible motor of one speed to the member 20, mounted for rotation, and connecting a reversible motor of a different speed to be rotatably mounted input member 34. The described arrangement prevents the application of feed-back torque from the output member 22 to the input member 34.

The described arrangement of wedging assemblies is also suitable to prevent the application of feedback torque to the driving equipment when the driving member is positively connected to the output member. The structure shown in FIG. 8 is the same as shown in FIG. 1, except that the driving member 34' is connected to the driven member 22' by splines or a gear, generally designated 100, as shown in detail in FIG. 9; also, the output member 22', instead of being provided on its external periphery with longitudinally extending grooves, as previously described in connection with a clutch, is provided with a smooth, unbroken, annular external surface 102 which provides a radially spaced, concentrically arranged race with respect to the race 24 of the member 20. Like parts are given like reference characters in this showing of the invention.

As shown in FIGS. 8 to 12, sets of wedging assemblies A and B are positioned in the radial space 62" between the concentric, radially spaced races 24 and 102, and an axially extending control finger 60 is located between the opposing assemblies of each set or pair. Also, spring means 90 are positioned between the races, and are in engagement with the top pins of each assembly on the sides thereof opposite the sides which face the control fingers, as previously described.

As shown in FIGS. 8 and 9, the output member 22' is provided with a rearwardly extending, annular portion 104, the external face of which is hobbed or otherwise formed to provide gear teeth 106 around its periphery. Correspondingly, the internal diameter of the input member 34' is provided with mating gear teeth 108. Approximately 2 to 4° clearance is provided between the meshing teeth. If desired, the members 22' and 34' may be matingly splined at the area indicated with a slight amount of clearance provided between the splines.

In the structure shown in FIGS. 8 and 9, it will be apparent that rotation of the driving shaft 38, and the driving member 34', will rotate the output member 22' in one direction, or the other, through the gear or splined connection 100 of their parts. With the member 20 fixed or held stationary, and when the driving member 34' is rotated from its stationary or neutral position, as shown in FIG. 10 in the direction of the arrow X, the fingers 60 rotate a slight amount, engage the top pins 68 of the assemblies A, displacing them linearly to allow driving in the direction X as shown in FIG. 11. The angular disposition of the elements 66' and 68' with respect to one another of the assemblies B permits uninterrupted driving in the direction of the arrow X. In the event the feedback torque would be imposed by the member 22' upon the driving member 34', the fingers 60 fall back and under the influence of the springs 90, the top pins 68 slide back across the pins 66. The assemblies A are idle from the standpoint of preventing feed-back torque in such direction of rotation of the output member. Feed-back torque in such direction however, acts to move together the centers of maximum height of the pins of the assemblies B, increasing their effective height to firmly connect the input member to the stationary member 20, and thereby prevent the transmittal of feed-back torque to the driving equipment.

When the driving member 34' is rotated in the direction of arrow Y (FIG. 10), the top pins 68' of the assemblies B are linearly displaced to allow rotation of the output member 22' in the direction of the arrow Y as shown in FIG. 12. Similarly, in the event that feed-back torque would be imposed by the output member 22' upon the driving equipment, the assemblies A take hold to firmly couple the input member to the stationary member 20, and prevent the imposition of reverse torque upon the driving member 34'. It will be understood that the relationship of the wedging elements of each of the assemblies with respect to one another, and the angles of drive and release for this embodiment of the invention are essentially the same as hereinbefore described in connection with the clutch version of the invention.

It is believed that some of the advantages and improved results furnished by the transmission of the invention will be apparent from the foregoing description of a preferred embodiment of the invention. The wedging elements' flat faces engage one another at a positive angle for linear movement, act to firmly maintain the elements in assembled relationship, and provide increased effectiveness as the load is increased. The cross-section of the elements permits such a large radius of curvature for their convex faces that the possibility of jamming to the extent that the transmission will not release when desired is eliminated. The contour of the wedging assembly elements permits a release angle which eliminates drag on the adjoining relatively rotatable members, and chatter. The overall diameter of which each of the wedging assemblies are capable, together with the relatively large radius of curvature possessed by each of the convex faces, serve to maintain the operating characteristics of the transmission at a high level, despite extended use under heavy load. The relationship of the wedging elements of opposing assemblies with respect to each other and with respect to the adjoining relatively rotatable members is such that compensation is provided for wear, and changes which may occur in the points of engagement or contact. In effect, the wedging assemblies are self-compensating for wear. Furthermore, the flat faces and the convex faces' substantial radius of curvature for any given size of elements affords effective operating wedging assemblies for bi-directional transmissions of extremely small size, as well as for units of large size.

While a preferred embodiment of the invention has been illustrated and described, it will be understood that it is within the scope of the invention to make various changes and modifications without departing from the spirit and scope of the invention as sought to be defined in the following claims.

I claim:
1. A bi-directional transmission comprising a pair of coaxial, radially spaced, relatively rotatable members, a pair of opposing wedging assemblies positioned between said members, each of said wedging assemblies comprising a pair of elements of substantially the same shape and each having a flat face and an opposite convex face, the elements being assembled with their flat faces in engagement with each other and with their convex faces in respective engagement with said members, the elements being dimensioned so that their assembled height would be greater than the spacing between said members if the elements were related so that their areas of maximum height were in alignment with one another, said elements being assembled with their areas of maximum height offset from one another, the angle of the plane of engagement of the flat faces of one assembly being opposite to the angle of the plane of engagement of the flat faces of the other assembly, control means positioned between said members and intermediate said wedging assemblies for coaction with an element of each of the assemblies, and resilient means coacting with one of the elements of each of said wedging assemblies to urge the elements together and against said members.

2. A bi-directional transmission comprising a pair of coaxial, radially spaced, relatively rotatable members, a pair of opposing wedging assemblies positioned between said members, each of said wedging assemblies comprising a pair of elements each having a cross-section providing a flat face and an opposite convex face, the elements being assembled with their flat faces in engagement with each other and with their convex faces in respective engagement with said members, the elements being dimensioned so that their assembled height would be greater than the spacing between said members if the elements were related so that their areas of maximum height were in alignment with one another, said elements being assembled with their areas of maximum height offset from one another, the plane of engagement of the flat faces being related to the tangent line at the point of engagement of a convex face with an adjoining member to provide a release angle greater than the friction angle of such engaging surfaces, the angle of the plane of engagement of the flat faces of one assembly being substantially the same as but opposite to the angle of the plane of engagement of the flat faces of the other assembly, control means positioned between said members and intermediate said wedging assemblies for coaction with an element of each of the assemblies, and resilient means coacting with an element of each of said wedging assemblies to urge the elements together and against said members.

3. A bi-directional transmission comprising a pair of coaxial, radially spaced, relatively rotatable members, a plurality of pairs of opposing wedging assemblies positioned between said members in circumferential, substantially equidistantly spaced relationship, each of said wedging assemblies comprising a pair of elements each having a cross-section providing a flat face and an opposite convex face, the elements being assembled with their flat faces in engagement with each other and with their convex faces in respective engagement with said members, the elements being dimensioned so that their assembled height would be greater than the spacing between said members if the elements were related so that their areas of maximum height were in alignment with one another, said elements being assembled with their areas of maximum height offset from one another, the plane of engagement of the flat faces being related to the tangent line at the point of engagement of a convex face with an adjoining member to provide a release angle greater than the friction angle of such engaging surfaces, the angle of the plane of engagement of the flat faces of one assembly of each pair being substantially the same as but opposite to the angle of the plane of engagement of the flat faces of the other assembly of the pair, control means positioned between said members and intermediate each pair of said opposing wedging assemblies for coaction with an element of each of the assemblies, and resilient means positioned between adjacent pairs of opposing wedging assemblies coacting with an element of each of said wedging assemblies on the side thereof opposite the side facing said control means to urge the elements together and against said members.

4. A bi-directional transmission comprising inner and outer members arranged in coaxial, radially spaced relationship, a plurality of pairs of opposing wedging assemblies positioned between said members in circumferentially spaced relationship, a third member having a plurality of circumferentially spaced, axially extending control fingers positioned between said inner and outer members with a control finger intermediate each pair of opposing wedging assemblies, said members being mounted for relative rotation, each of said wedging assemblies comprising a pair of coaxially extending pins each having a cross-section providing a flat face and an opposite convex face, the pins being assembled with their flat faces in engagement with each other and with their convex faces in respective engagement with said inner and outer members, the pins being dimensioned so that their assembled height would be greater than the spacing between said inner and outer members if the pins were related so that their areas of maximum height were in alignment with one another, said pins being assembled with their areas of maximum height laterally offset from one another, the plane of engagement of the flat faces being related to the tangent line at the point of engagement of a convex face with an adjoining member to provide a release angle greater than the friction angle of the engaged surfaces, the angle of the plane of engagement of the flat faces of one assembly of each pair being opposite to the angle of the plane of engagement of the flat faces of the other assembly of a pair, and resilient means positioned between adjacent pairs of wedging assemblies coacting with the pin of each of said wedging assemblies adjoining the outer member on the side thereof opposite the side facing a control finger to urge the pins of each assembly together and against said inner and outer members.

5. A bi-directional transmission as set forth in claim 4, wherein the pins adjoining the outer member are each of greater width than the pins adjoining the inner member and overhang their sides when the transmission is in neutral position, the side of each pin adjoining the outer member facing a control finger being flat for cooperative engagement by a flat side provided on a control finger, the opposite side of each pin adjoining the outer member being provided with a recess substantially midway of its length; and wherein the resilient means comprises a compression spring positioned between each adjacent pair of wedging assemblies, the ends of the spring being located in said recesses.

6. A bi-directional transmission comprising inner and outer members arranged in coaxial, radially spaced relationship, a plurality of pairs of opposing wedging assemblies positioned between said members in circumferentially spaced relationship, a third member having a plurality of circumferentially spaced, axially extending control fingers positioned between said inner and outer members with a control finger intermediate each pair of opposing wedging assemblies, said members being mounted for relative rotation, each of said wedging assemblies comprising a pair of coaxially extending pins each having a cross-section providing a flat face and an opposite convex face, the pins being assembled with their flat faces in engagement with each other and with their convex faces in respective engagement with said inner and outer members, the pins being dimensioned so that their assembled height would be greater than the spacing between said inner and outer members if the pins were related so that their areas of maximum height were in alignment with one another, said pins being assembled with their areas of maximum height laterally offset from one another, the points of engagement of the convex faces with the respective inner and outer members providing a driving angle of not less than approximately 2°, the plane of engagement of the flat faces being related to the tangent line at the point of engagement of a convex face with an adjoining member to provide a release angle not less than approximately 12°, the driving and release angles of the wedging assemblies of each pair being oppositely directed, and resilient means positioned between adjacent pairs of wedging assemblies coacting with the pin of each of said wedging assemblies adjoining the outer member on the side thereof opposite the side facing a control finger to urge the pins of each assembly together and against said inner and outer members.

7. A bi-directional transmission as set forth in claim 6, wherein the inner member and the third member are rotatably mounted and secured for rotation together, the outer member is stationary, and the outer periphery of the inner member and the inner periphery of the outer member are concentric.

8. A bi-directional transmission as set forth in claim 6, wherein the inner member and the third member are rotatably mounted and secured for rotation together, the outer member is stationary, the outer periphery of the inner member and the inner periphery of the outer member are concentric; and wherein the driving angle is between 2 and 8° and the release angle is between 12 and 40°.

9. A bi-directional clutch comprising relatively rotatable inner and outer members arranged in coaxial, radially spaced relationship, the outer periphery of the inner member being provided with a plurality of pairs of axially extending, concavely-shaped grooves in circumferentially spaced relationship, the outer member providing a continuous, annular surface, a plurality of pairs of opposing wedging assemblies positioned between said members, a third member mounted for rotation and having a plurality of circumferentially spaced, axially extending control fingers positioned between said inner and outer members with a control finger intermediate each pair of opposing wedging assemblies, each of said wedging assemblies comprising a pair of coaxially extending pins each having a cross-section providing a flat face and an opposite convex face, the pins being assembled with their flat faces in engagement with each other and with their convex faces in respective engagement with said inner and outer members, the convex faces of the pins adjoining the inner member being positioned in said grooves, the pins of each assembly being dimensioned so that their assembled height would be greater than the spacing between said inner and outer members at the grooved areas if the pins were related so that their areas of maximum height were in alignment with one another, said pins being assembled with their areas of maximum height laterally offset from one another, the plane of engagement of the flat faces being related to the tangent line at the point of engagement of a convex face with an adjoining member to provide a release angle greater than the friction angle of a convex face and an adjoining member, the angle of the plane of engagement of the flat faces of one pair being opposite to the angle of the plane of engagement of the flat faces of the other assembly of a pair, and resilient means coacting with the pin of each of said wedging assemblies adjoining the outer member on the side thereof opposite the side facing a control finger to urge the pins of each assembly together and against said inner and outer members.

10. A bi-directional clutch comprising inner and outer members arranged in coaxial, radially spaced relationship, one of said members being mounted for rotation and the other stationary, the outer periphery of the inner member being provided with a plurality of pairs of axially extending, concavely-shaped grooves in circumferentially spaced relationship, the outer member providing a continuous, annular surface, a plurality of pairs of opposing wedging assemblies positioned between said members, one pair of assemblies for each pair of grooves, a third member mounted for rotation and having a plurality of circumferentially spaced, axially extending control fingers positioned between said inner and outer members with a control finger intermediate each pair of opposing wedging assemblies, each of said wedging assemblies comprising a pair of coaxially extending pins each having a cross-section providing a flat face and an opposite convex face, the pins being assembled with their flat faces in engagement with each other and with their convex faces in respective engagement with said inner and outer members, the convex faces of the pins adjoining the inner member being positioned in said grooves and having a radius of curvature slightly less than the radius of curvature of the concavely-shaped grooves, the pins of each assembly being dimensioned so that their assembled height would be gerater than the spacing between said inner and outer members at the grooved areas if the pins were related so that their areas of maximum height were in alignment with one another, said pins being assembled with their areas of maximum height laterally offset from one another, the points of engagement of the convex faces with the respective inner and outer members providing a driving angle of not less than approximately 2°, the plane of engagement of the flat faces being related to the tangent line at the point of engagement of a convex face with an adjoining member to provide a release angle not less than approximately 12°, the driving and release angles of the wedging assemblies of each pair being oppositely directed, and resilient means positioned between adjacent pairs of wedging assemblies coacting with the pin of each of said wedging assemblies adjoining the outer member on the side thereof opposite the side facing a control finger to urge the pins of each assembly together and against said inner and outer members.

11. A bi-directional clutch as set forth in claim 10, wherein the pins adjoining the outer member are each of greater width than the pins adjoining the inner member and overhang their sides when the clutch is in neutral position, the side of each pin adjoining the outer member facing a control finger being flat for cooperative engagement by a flat side provided on a control finger, the opposite side of each pin adjoining the outer member being provided with a recess substantially midway of its length; and wherein the resilient means comprises a compression spring positioned between each adjacent pair of wedging assemblies, the ends of the spring being located in said recesses.

12. A bi-directional clutch as set forth in claim 10, wherein the pins adjoining the outer member are each of greater width than the pins adjoining the inner member and overhang their sides when the clutch is in neutral position, the side of each pin adjoining the outer member facing a control finger being flat for cooperative engagement by a flat side provided on a control finger, the opposite side of each pin adjoining the outer member being provided with a recess substantially midway of its length; wherein the resilient means comprises a compression spring positioned between each adjacent pair of wedging assemblies, the ends of the spring being located in said recesses; wherein the plurality of pairs of grooves, pairs of wedging assemblies and the control fingers are substantially equidistantly spaced; and wherein the driving angle is between approximately 2 and 8° and the release angle is bewteen approximately 12 and 40°.

References Cited in the file of this patent

UNITED STATES PATENTS

| 1,726,329 | Aiken | Aug. 27, 1929 |
| 1,760,708 | Miller | May 27, 1930 |
| 1,944,069 | Connors | Jan. 16, 1934 |
| 2,240,359 | Weigel | Apr. 29, 1941 |

FOREIGN PATENTS

| 412,050 | Great Britain | June 21, 1934 |
| 1,146,081 | France | May 20, 1957 |